United States Patent
Akiyama

(10) Patent No.: US 11,341,739 B2
(45) Date of Patent: May 24, 2022

(54) IMAGE PROCESSING DEVICE, IMAGE PROCESSING METHOD, AND PROGRAM RECORDING MEDIUM

(71) Applicant: NEC Corporation, Tokyo (JP)

(72) Inventor: Tatsuo Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 777 days.

(21) Appl. No.: 16/074,340

(22) PCT Filed: Feb. 9, 2017

(86) PCT No.: PCT/JP2017/004686
§ 371 (c)(1),
(2) Date: Jul. 31, 2018

(87) PCT Pub. No.: WO2017/141802
PCT Pub. Date: Aug. 24, 2017

(65) Prior Publication Data
US 2021/0182587 A1    Jun. 17, 2021

(30) Foreign Application Priority Data
Feb. 15, 2016 (JP) .............................. JP2016-025905

(51) Int. Cl.
*G06V 10/98* (2022.01)
*G06T 5/00* (2006.01)
*G06T 5/20* (2006.01)
*G06V 10/20* (2022.01)
*G06V 10/34* (2022.01)
*G06V 30/10* (2022.01)

(52) U.S. Cl.
CPC ............ *G06V 10/993* (2022.01); *G06T 5/002* (2013.01); *G06T 5/20* (2013.01); *G06V 10/20* (2022.01); *G06V 10/34* (2022.01); *G06V 30/10* (2022.01)

(58) Field of Classification Search
CPC ...... G06K 9/036; G06K 9/36; G06K 2209/01; G06K 9/38; G06K 9/44; G06T 5/20; G06T 5/002; G06V 10/993; G06V 10/20; G06V 10/34; G06V 30/10
USPC ......................................................... 382/260
See application file for complete search history.

(56) References Cited

U.S. PATENT DOCUMENTS

2003/0031366 A1* 2/2003 Li ............................ G06K 9/38
382/206
2003/0044068 A1* 3/2003 Kagehiro ............... G06K 9/325
382/182

FOREIGN PATENT DOCUMENTS

| JP | 58-123176 | 7/1983 |
| JP | 2-191085 | 7/1990 |
| JP | 10171923 A * | 6/1998 |

(Continued)

OTHER PUBLICATIONS

International Search Report dated May 9, 2017, in corresponding PCT International Application.

*Primary Examiner* — Nay A Maung
*Assistant Examiner* — Daniella M. DiGuglielmo

(57) ABSTRACT

The present invention provides a new image processing device that is robust against a change in capturing conditions. An image processing device 100 has an acquisition unit 110 for acquiring an image, a smoothing unit 120 for smoothing the acquired image with a prescribed smoothing level, a binarization unit 130 for binarizing the smoothed image, and a control unit 140 for making the smoothing unit 120 execute multiple sessions of smoothing differing in the smoothing level.

7 Claims, 13 Drawing Sheets

(56) References Cited

FOREIGN PATENT DOCUMENTS

| | | | | |
|---|---|---|---|---|
| JP | 10-222602 | | 8/1998 | |
| JP | 10222602 A | * | 8/1998 | |
| JP | 11-282960 | | 10/1999 | |
| JP | 2003067738 A | * | 3/2003 | ............ H04N 1/409 |
| JP | 2004-199622 | | 7/2004 | |
| JP | 2004199622 A | * | 7/2004 | |
| JP | 2005-38431 | | 2/2005 | |
| JP | 2010-123090 | | 6/2010 | |
| WO | WO 2015/064107 | | 5/2015 | |

* cited by examiner

Fig.2

| | SMOOTHING LEVEL (LOW) | SMOOTHING LEVEL (HIGH) |
|---|---|---|
| MOVING-AVERAGE FILTER | 1/9 1/9 1/9<br>1/9 1/9 1/9<br>1/9 1/9 1/9 | 1/25 1/25 1/25 1/25 1/25<br>1/25 1/25 1/25 1/25 1/25<br>1/25 1/25 1/25 1/25 1/25<br>1/25 1/25 1/25 1/25 1/25<br>1/25 1/25 1/25 1/25 1/25 |
| WEIGHTED-AVERAGE FILTER | 1/16 2/16 1/16<br>2/16 4/16 2/16<br>1/16 2/16 1/16 | 1/256 4/256 6/256 4/256 1/256<br>4/256 16/256 24/256 16/256 4/256<br>6/256 24/256 36/256 24/256 6/256<br>4/256 16/256 24/256 16/256 4/256<br>1/256 4/256 6/256 4/256 1/256 |

Fig.6

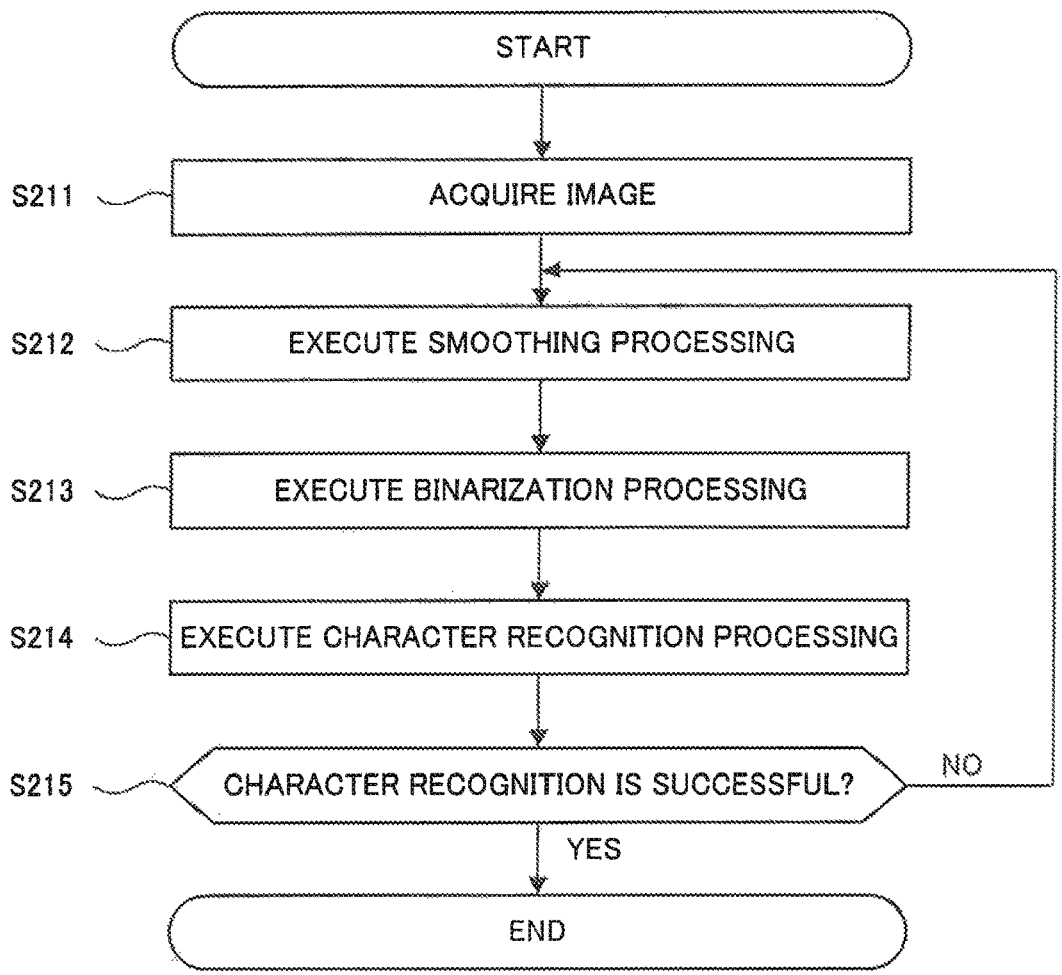

- S211: ACQUIRE IMAGE
- S212: EXECUTE SMOOTHING PROCESSING
- S213: EXECUTE BINARIZATION PROCESSING
- S214: EXECUTE CHARACTER RECOGNITION PROCESSING
- S215: CHARACTER RECOGNITION IS SUCCESSFUL?

Fig.7

| SMOOTHING LEVEL | RESULT OF CHARACTER RECOGNITION |
|---|---|
| $L_1$ (HIGHEST) | UNSUCCESSFUL |
| $L_2$ | UNSUCCESSFUL |
| $L_3$ | SUCCESSFUL (WITHOUT FALSE RECOGNITION) |
| $L_4$ | SUCCESSFUL (WITH FALSE RECOGNITION) |
| $L_5$ (LOWEST) | SUCCESSFUL (WITH FALSE RECOGNITION) |

IMAGE PROCESSING DEVICE, IMAGE PROCESSING METHOD, AND PROGRAM RECORDING MEDIUM

CROSS-REFERENCE TO RELATED PATENT APPLICATIONS

This application is a National Stage Entry of International Application No. PCT/JP2017/004686, filed Feb. 9, 2017, which claims priority from Japanese Patent Application No. 2016-025905, filed Feb. 15, 2016. The entire contents of the above-referenced applications are expressly incorporated herein by reference.

TECHNICAL FIELD

The present disclosure relates to image processing.

BACKGROUND ART

In image processing, particularly image processing on an image captured by an image sensor, a capturing condition (such as illumination and focus) of an image is not always fixed. For example, illumination for a subject may vary from image to image with a kind of light source and a positional relationship between the light source and the subject even when the subject is the same. Further, illumination for one subject (included in one image) may also vary with place (that is, illumination may be uneven).

PTLs 1 to 3 each disclose an image processing technology concerned with recognition of a character and the like. For example, PTL 1 discloses an industrial character recognition method of determining a degree of a matching between a captured image and a template image by template matching, expanding one of the captured image and the template images according to a determination result, and executing the template matching again.

CITATION LIST

Patent Literature

[PTL 1] Japanese Unexamined Patent Application Publication No. H11 (1999)-282960
[PTL 2] Japanese Unexamined Patent Application Publication No. 2010-123090
[PTL 3] International Patent Publication No. 2015/064107

SUMMARY OF INVENTION

Technical Problem

The expanding processing described in PTL 1 is processing on a binarized image. Such expanding processing simply increases a total number (area) of pixels of one of two gradations (for example, white and black).

One exemplary object of the present disclosure is to provide new image processing that is robust against a change in a capturing condition.

Solution to Problem

An image processing device according to an example aspect of the example embodiment includes:
a processor configured to:
acquire an image;
smooth the acquired image at a predetermined smoothing level;
binarize the smoothed image; and
smooth the image while varying the smoothing level for a plurality of times.

A character recognition device according to an example aspect of the example embodiment includes:
a processor configured to:
acquire an image;
smooth the acquired image at a predetermined smoothing level;
binarize the smoothed image;
recognize a character included in the binarized image; and
smooth the image while varying the smoothing level depending on a result of character recognition.

An image processing device according to an example aspect of the example embodiment includes:
a processor configured to:
acquire an image;
smooth the acquired image at a predetermined smoothing level;
binarize the smoothed image; and
terminate an operation when a predetermined condition is satisfied and smooth the acquired image while varying the smoothing level when the condition is not satisfied.

An image processing method according to an example aspect of the example embodiment includes:
acquiring an image;
smoothing the acquired image at a predetermined smoothing level;
binarizing the smoothed image; and
terminating an operation when a predetermined condition is satisfied, and smoothing and binarizing on the acquired image again while varying the smoothing level when the condition is not satisfied.

A program recording medium according to an example aspect of the example embodiment is computer-readable and records a program causing a computer to execute:
acquiring an image;
smoothing the acquired image at a predetermined smoothing level;
binarizing the smoothed image; and
smoothing the image while varying the smoothing level for a plurality of times.

A program recording medium according to an example aspect of the example embodiment is computer-readable and records a program causing a computer to execute:
acquiring an image;
smoothing the acquired image at a predetermined smoothing level;
binarizing the smoothed image; and
terminating an operation when a predetermined condition is satisfied, and smoothing the image while varying the smoothing level on the acquired image when the condition is not satisfied.

Advantageous Effects of Invention

According to the present disclosure, image processing that is robust against a change in a capturing condition is provided.

BRIEF DESCRIPTION OF DRAWINGS

FIG. 2 is a diagram exemplifying a filter and a smoothing level of the filter.

FIG. 6 is a flowchart illustrating one example of operations of the character recognition device.

FIG. 7 is a diagram exemplifying a relationship between a smoothing level and a result of character recognition.

EXAMPLE EMBODIMENT

First Example Embodiment

Figure 1:
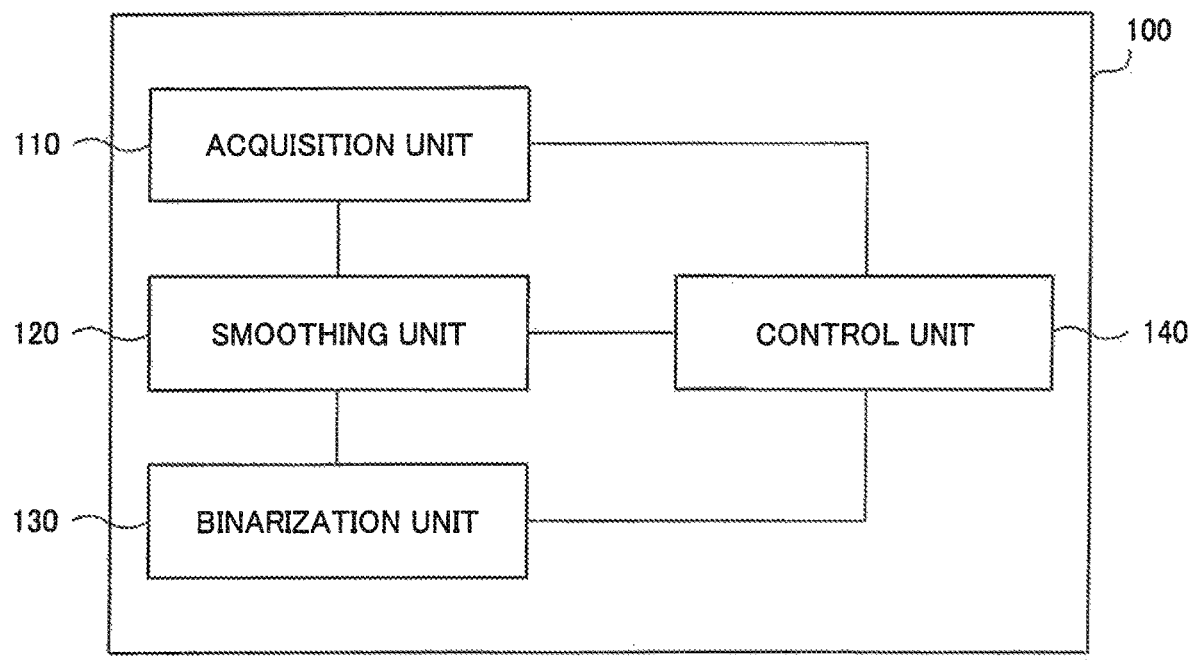
FIG. 1 is a block diagram illustrating one example of a configuration of an image processing device.

FIG. 1 is a block diagram illustrating a configuration of an image processing device 100 according to a first example embodiment of the present disclosure. The image processing device 100 includes at least an acquisition unit 110, a smoothing unit 120, a binarization unit 130 and a control unit 140. The image processing device 100 may be realized by a combination of a processor, hardware such as a memory, and software such as a program.

The acquisition unit 110 acquires an image. For example, the acquisition unit 110 acquires an image by receiving an input of digital data or an analog signal representing an image. In other words, "acquire an image" can also be said to acquire image data or an image signal. An image acquired by the acquisition unit 110 represents an image captured by a capturing device including, for example, a complementary metal-oxide-semiconductor (CMOS) image sensor, a charge coupled device (CCD) image sensor, and the like.

The smoothing unit 120 executes smoothing processing on an image. The smoothing unit 120 smooths the image acquired by the acquisition unit 110 at a predetermined smoothing level. The smoothing level defines a degree of smoothing by the smoothing processing. Hereinafter, a parameter defining the smoothing level is also referred to as a "smoothing parameter".

The smoothing processing is, for example, filtering processing realized by a filter circuit. Specifically, a moving-average filter, a weighted-average filter, or the like is used in the smoothing processing. In this case, the smoothing level can be changed by at least one of a size of a filter and a weighting factor (operator). The size of the filter can be changed by changing one or both of a width and a height of the filter. The smoothing unit 120 may include a plurality of filters at different smoothing levels, or include one filter at the smoothing level that can be changed by the control unit 140.

FIG. 2 is a diagram exemplifying the filter and the smoothing level of the filter. This example is an example of changing the smoothing level by the width and the height of the filter. The moving-average filter is a filter in which pixels have the same weighting factor ("$\frac{1}{9}$" or "$\frac{1}{25}$" in FIG. 2). Meanwhile, the weighted-average filter is a filter in which pixels do not have the same weighting factor, but have different weighting factors and are weighted at the center. The filter in the present example embodiment may be a Gaussian filter in which the weighting depends on Gaussian distribution (normal distribution).

Note that, in the present example embodiment, a sum of weighting factors of a filter may not be "1". Further, the size of the filter may not have the same width and height. The smoothing unit 120 may change the smoothing level by changing any one of the width and the height of the filter. The smoothing parameter may be any of the width, the height, the size, and the weighting factor of the filter, or may be a combination thereof.

The smoothing processing is generally used to remove noise included in an image. However, a purpose of the smoothing processing in the present example embodiment is to blur (make unclear) an object (such as a character, unevenness, and a pattern) included in an image rather than to remove noise. It can be said that executing the smoothing processing at different smoothing levels on one image for multiple times corresponds to acquiring, from the image, a plurality of kinds of images including objects that vary in unclearness.

The binarization unit 130 executes binarization processing on an image. The binarization unit 130 binarizes the image smoothed by the smoothing unit 120 based on a threshold value. As the threshold value herein, the same value may be used for pixels forming the image, and a value (that can be) different for each pixel may also be used. For example, the threshold value may be determined for each local region including pixels around a pixel as a binarization target.

The control unit 140 controls execution of image processing. The control unit 140 controls the smoothing processing by the smoothing unit 120. For example, the control unit 140 causes the smoothing unit 120 to smooth the image at different smoothing levels for multiple times. The control unit 140 may control the binarization processing by the binarization unit 130. For example, the control unit 140 may change a method of the binarization processing according to the smoothing processing executed by the smoothing unit 120.

Figure 3:
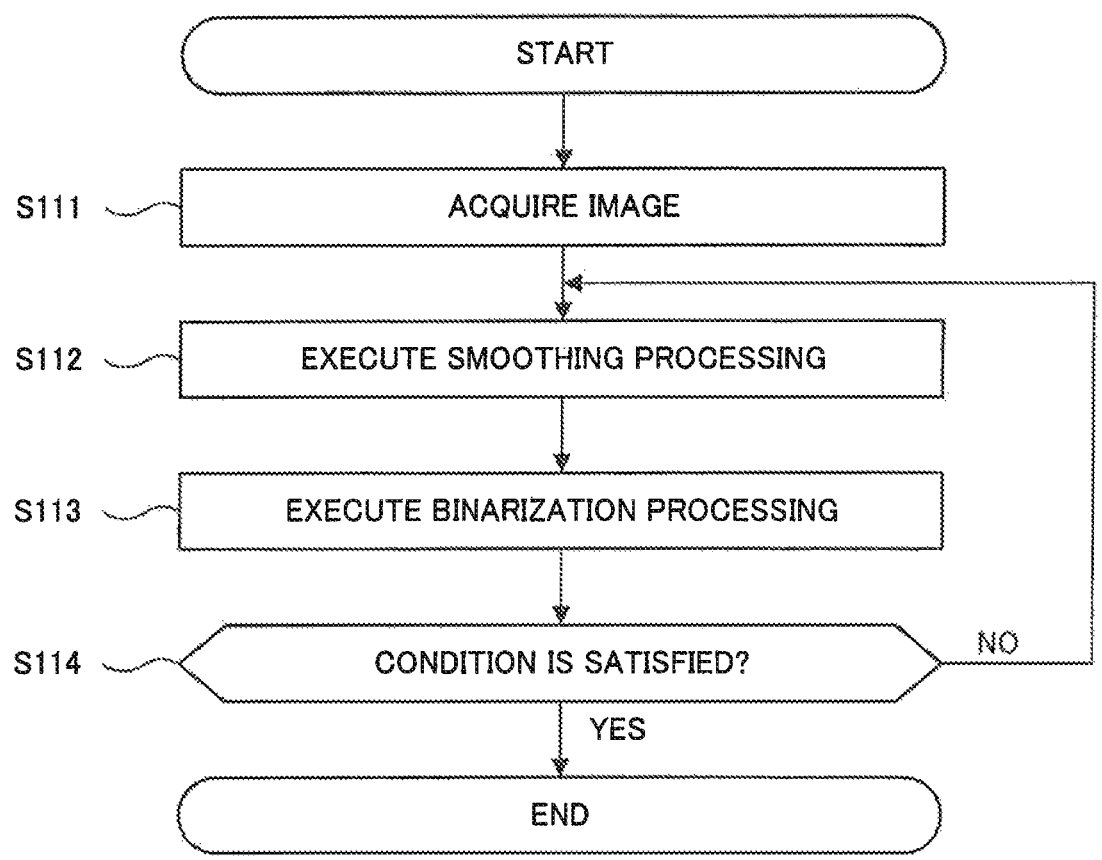
FIG. 3 is a flowchart illustrating one example of operations of the image processing device.

FIG. 3 is a flowchart illustrating one example of operations of the image processing device 100. In Step S111, the acquisition unit 110 acquires an image. When the acquisition unit 110 acquires the image, the smoothing unit 120 executes the smoothing processing on the image acquired in Step S111 (Step S112). The binarization unit 130 executes the binarization processing on the image smoothed in Step S112 (Step S113).

When the binarization processing is executed, the control unit 140 determines whether a predetermined condition is satisfied (Step S114). The condition herein is determined based on, for example, the image on which the smoothing processing and the binarization processing have been executed. The control unit 140 may evaluate the image on which the smoothing processing and the binarization processing have been executed according to a predetermined evaluation criterion, and determine whether a predetermined condition is satisfied according to the evaluation result. Further, by comparing the number of coupling regions (regions coupled to each other between adjacent pixels in the same gradation as that of characters) obtained by binarization with a predetermined value, the control unit 140 may determine whether the predetermined condition is satisfied. Alternatively, the evaluation herein may be executed by another component different from the control unit 140. In this case, the control unit 140 acquires an evaluation result from the other component and then determine whether the predetermined condition is satisfied.

When the predetermined condition is satisfied (YES in Step S114), the control unit 140 terminates the operations without causing the execution of the smoothing processing and the binarization processing again. On the other hand, when the predetermined condition is not satisfied (NO in Step S114), the control unit 140 causes the smoothing unit 120 to execute the smoothing processing in Step S112 again. In this case (that is, in the second smoothing processing), the control unit 140 sets a value different from the initial value as the smoothing parameter. Further, when the smoothing processing is repeated for more than three times, the control unit 140 sets a value different from any values previously used (for the same image) as the smoothing parameter.

Figure 4:
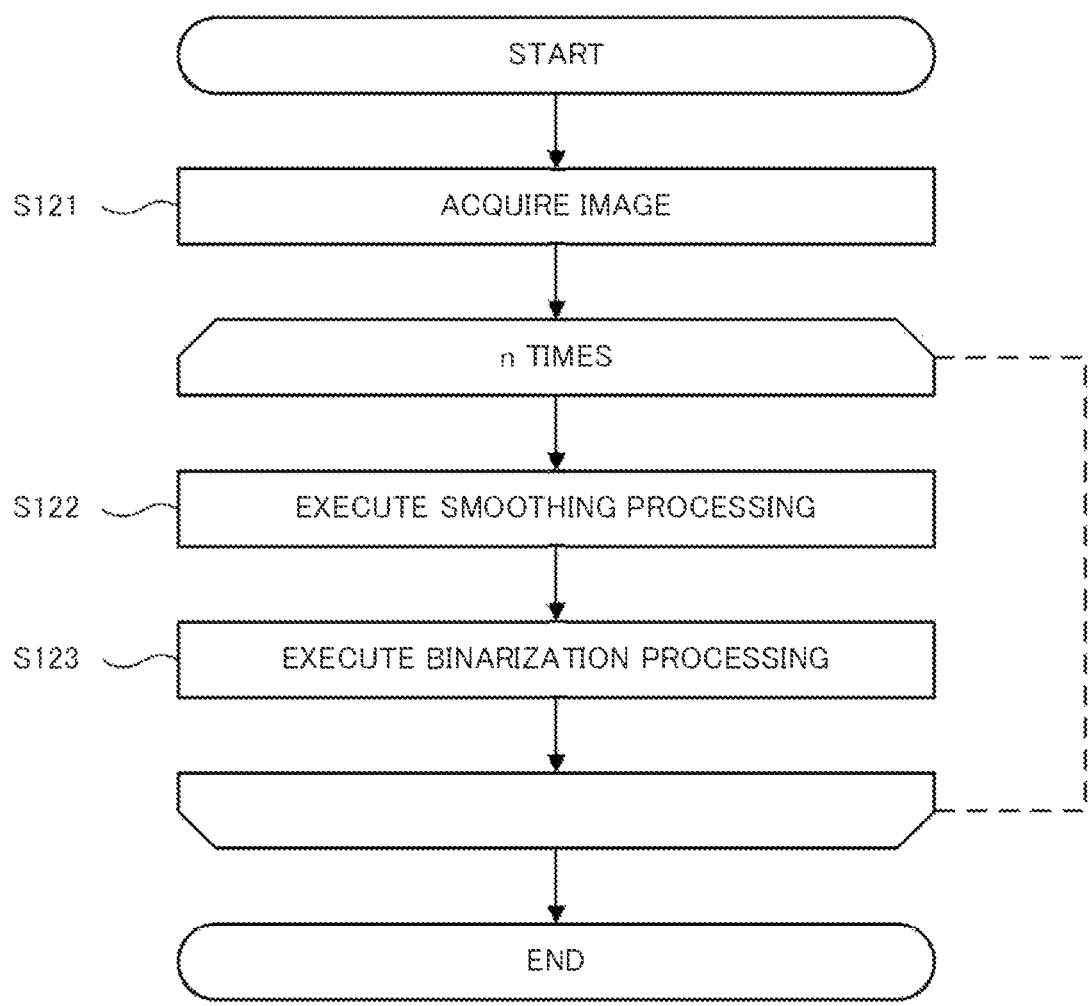
FIG. 4 is a flowchart illustrating another example of operations of the image processing device.

FIG. 4 is a flowchart illustrating another example of operations of the image processing device 100. In Step S121, the acquisition unit 110 acquires the image as in Step S111. When the acquisition unit 110 acquires the image, the control unit 140 causes the smoothing unit 120 and the binarization unit 130 to execute loop processing of repeating the smoothing processing and the binarization processing on the image acquired in Step S121 for n times (Steps S122 and S123). The control unit 140 sets different smoothing levels in each loop processing for n times. The smoothing unit 120 executes the smoothing processing according to the set smoothing level. Note that, a value of n, namely, the number of times of the loop processing is not particularly limited as long as it is two or more. Also in this example, the image processing device 100 may execute processing determined in Step S114 after the termination of the loop processing, or a device other than the image processing device 100 may execute the processing determined in Step S114.

Note that, the image processing device 100 may execute the image processing for multiple times simultaneously instead of successively. Also in the example of FIG. 3, when the predetermined condition is satisfied, the image processing device 100 executes the smoothing processing and the binarization processing only once without repetition.

As described above, the image processing device 100 of the present example embodiment is able to obtain a plurality of images having different degrees of smoothing from one image by executing the smoothing processing at different smoothing levels for multiple times. In this way, the image processing device 100 is more likely to obtain an image of a desired image quality than when image processing is executed with only a specific smoothing parameter. Thus, an image processing that is robust against a change in a capturing condition can be realized.

Second Example Embodiment

Figure 5:
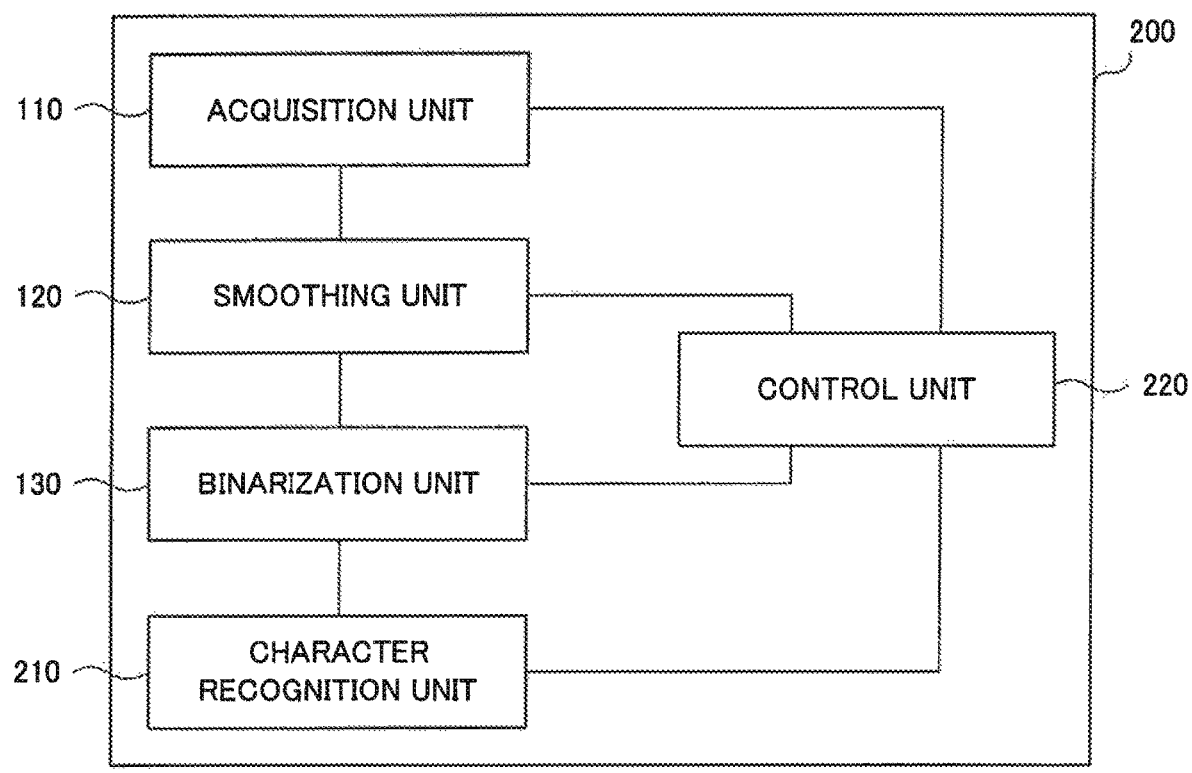
FIG. 5 is a block diagram illustrating one example of a configuration of a character recognition device.

FIG. 5 is a block diagram illustrating a configuration of a character recognition device 200 according to a second example embodiment of the present disclosure. The character recognition device 200 includes a character recognition unit 210 and a control unit 220 in addition to the acquisition unit 110, the smoothing unit 120, and the binarization unit 130 that are the same as those in the first example embodiment. It can also be said that the character recognition device 200 is an image processing device having a character recognition function.

Note that, in the present example embodiment, the same term as the term described in the first example embodiment is used to represent the same as in the first example embodiment except for that the term particularly has a definition or description. In addition, a component provided with the same reference numeral as that in the first example embodiment has at least the same configuration as that in the first example embodiment.

The character recognition unit 210 recognizes a character included in an image. The character recognition unit 210 recognizes a character included in an image which is smoothed by the smoothing unit 120 and is binarized by the binarization unit 130. The character recognition unit 210 can use a known character recognition technology for character recognition. A specific technique for character recognition by the character recognition unit 210 is not particularly limited herein.

The control unit 220 controls image processing, similarly to the control unit 140 in the first example embodiment. Specifically, however, the control by the control unit 220 is partially different from the control by the control unit 140. The control unit 220 controls the image processing according to a result of the character recognition by the character recognition unit 210.

FIG. 6 is a flowchart illustrating one example of operations of the character recognition device 200. Note that, the processing in Steps S211 to S213 is respectively the same as the processing in Steps S111 to S113 (see FIG. 3) in the first example embodiment, and thus description thereof will be omitted. However, in Step S212, the smoothing unit 120 executes the smoothing processing at the highest smoothing level. In other words, at this time, the control unit 220 causes the smoothing unit 120 to execute the smoothing processing at the highest smoothing level. Herein, a "high" smoothing level represents a smoothing level at which a degree of unclearness of an object increases (that is, at which an object becomes more unclear).

The character recognition unit 210 executes character recognition processing on the image binarized in Step S213 (Step S214). Specifically, the character recognition unit 210 attempts to detect and recognize one or a plurality of previously registered characters from the binarized image. Note that, the character recognition unit 210 does not always succeed in recognizing a character, and may fail to recognize a character depending on a subject and image quality.

When the character recognition processing is executed, the control unit 220 executes processing according to the result of the character recognition in Step S214. Specifically, the control unit 220 determines whether the character recognition is successful (Step S215). A determination criterion (namely, a criterion for determining "success") in Step S215 is not particularly limited. For example, the control unit 220 may determine that the character recognition is successful when a predetermined number of characters (including one) can be recognized from the image, or may determine that the character recognition is successful when a predetermined character string (such as a specific number and a specific word) can be recognized. Alternatively, the control unit 220 may evaluate the result of the character recognition based on a predetermined evaluation criterion, and may determine that the character recognition is successful when a predetermined criterion is satisfied.

When the character recognition is successful (YES in Step S215), the control unit 220 terminates the operations without causing the execution of the smoothing processing, the binarization processing, and the character recognition processing again. On the other hand, when the character recognition is unsuccessful (NO in Step S215), the control unit 220 causes the smoothing unit 120 to execute the smoothing processing in Step S212 again.

In this case, the control unit 220 sets a smoothing level different from the previous time. Specifically, the control unit 220 sets the smoothing level lower by one level from the previous time. In other words, the control unit 220 causes the smoothing unit 120 to execute next smoothing processing at the highest smoothing level among unprocessed smoothing levels.

The control unit 220 repeats the processing in Steps S212 to S215 until the character recognition is successful. Alternatively, when the character recognition is not successful with any of the plurality of smoothing levels, the control unit 220 may execute predetermined processing related to failure (namely, error) of the character recognition.

The control unit 220 may output data when the character recognition is successful. For example, the control unit 220 may output data (such as a character code) indicating a recognized character or output data indicating an image in which the character recognition is successful. Alternatively, the control unit 220 may execute processing according to the result of the character recognition.

As described above, the character recognition device 200 in the present example embodiment can repeat the image processing according to the result of the character recognition. In this way, the character recognition device 200 can avoid execution of unnecessary processing in comparison with a case where image processing is executed for a predetermined number of times and a character is then recognized. Further, the character recognition device 200 can execute the character recognition processing by using an image in descending order of smoothing level. In this way, the character recognition device 200 can reduce a possibility of false recognition of a character and execute the character recognition with high accuracy regardless of a capturing condition.

For example, when a display material (such as a card and a printed matter) including a character is captured and light projected on the display material has uneven illumination, unevenness in the image may be mistakenly recognized as (a part or the whole of) a character by the character recognition after the binarization processing. Similarly, when the display material including a character is captured and the display material includes a pattern that is not the character, the pattern in the image may be mistakenly recognized as a character by the character recognition after the binarization processing. Such false recognition is obvious particularly when local binarization processing is used as the binarization processing.

The image on which the smoothing processing has been executed before the binarization processing includes not only a blur outline (edge) of a character but also blur unevenness and a blur pattern as described above. A higher level of smoothing increases a possibility that a character is not recognized, and also increases a possibility that such unevenness and pattern are not recognized as a character at the same time. Therefore, when the smoothing parameter can be set to an appropriate value, the character is more likely to be correctly recognized, whereas an image in which unevenness and pattern are less likely to be mistakenly recognized as a character, that is, the image in which a desirable recognition result can be expected, is obtained.

FIG. 7 is a diagram exemplifying a relationship between the smoothing level and the result of character recognition. Herein, it is assumed that $L_1$ is the highest and $L_2$, $L_3$, $L_4$, and $L_5$ are in decreasing order (that is, $L_5$ is the lowest) among the smoothing levels $L_1$, $L_2$, $L_3$, $L_4$, and $L_5$.

In this example, when the smoothing level is $L_1$ or $L_2$, a character in an image is blurred to such a degree that the character cannot be distinguished, and thus the character recognition is unsuccessful. On the other hand, when the smoothing level is $L_3$, $L_4$, or $L_5$, a character is clearer (that is, an edge is sharper) than a character when the smoothing level is $L_1$ or $L_2$, and thus the character recognition is successful.

However, when the smoothing level is $L_4$ or $L_5$, the degree of smoothing is lower than when the smoothing level is $L_3$, and thus unevenness and a pattern are not blurred enough and mistakenly recognized as components of a character. Then, in such a case, even when the character recognition is successful, even the unevenness and the pattern are recognized as components of the character, and therefore the result of the character recognition is not correct.

Herein, assuming that the character recognition device 200 executes the processing in FIG. 6 in descending order of the smoothing level (in order from $L_1$ to $L_5$) and in ascending order of the smoothing level (in order from $L_5$ to $L_1$), a difference arises in results as follows. In other words, in the former case (in the order from $L_1$ to $L_5$), the character recognition device 200 fails in the character recognition at a stage where $L_1$ or $L_2$ is set as the smoothing level, and succeeds in the character recognition at a stage where $L_3$ is set as the smoothing level (that is, for a third time). In contrast, in the latter case (in the order from $L_5$ to $L_1$), the character recognition device 200 succeeds in the character recognition at a stage where $L_5$ is set as the smoothing level (that is, for a first time). However, in this case, the character recognition device 200 fails to "correctly" recognize a character because a result of the character recognition is an error.

As described above, the character recognition device 200 can enhance accuracy of the character recognition further by executing the image processing in the descending order of the smoothing level than by executing the processing in the ascending order of the smoothing level. Further, the character recognition device 200 can realize the image processing that is robust against unevenness and a pattern of a display material that may occur irregularly by repeatedly executing the character recognition while changing the smoothing level.

Third Example Embodiment

Figure 8:
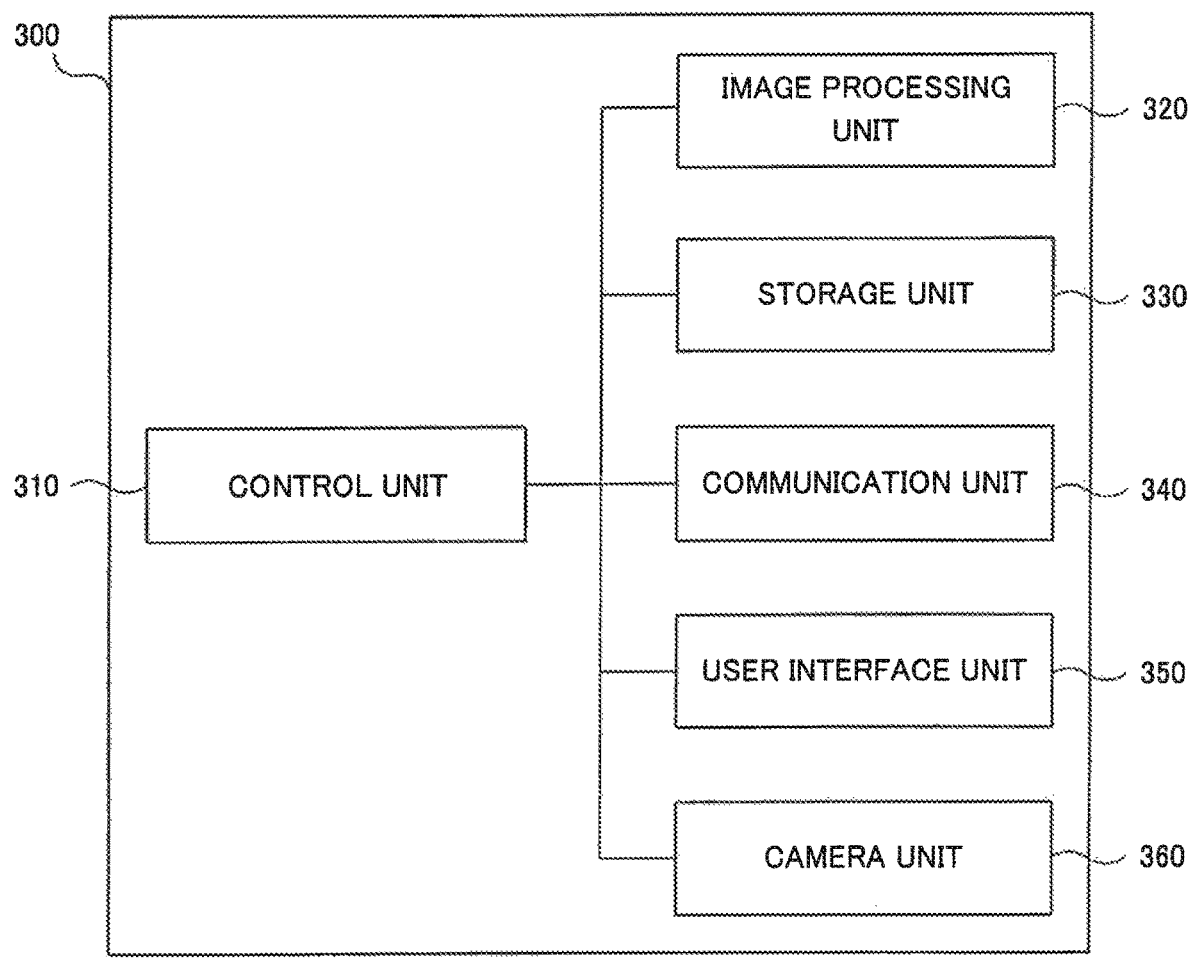
FIG. 8 is a block diagram illustrating one example of a configuration of a communication terminal.

FIG. 8 is a block diagram illustrating a configuration of a communication terminal 300 according to a third example embodiment of the present disclosure. The communication terminal 300 includes a control unit 310, an image processing unit 320, a storage unit 330, a communication unit 340, a user interface (UI) unit 350, and a camera unit 360. The communication terminal 300 is, for example, a mobile communication terminal such as a smartphone and a tablet terminal, but may not be necessarily limited to a mobile communication terminal.

The communication terminal 300 has a configuration corresponding to one example of the character recognition device 200 described in the second example embodiment. Further, in the present example embodiment, the same term as the term described in the first example embodiment or the second example embodiment is used to represent the same as in the first example embodiment or the second example embodiment except for that the term particularly has a definition or description.

The control unit 310 controls operations of each of the units in the communication terminal 300. The control unit 310 includes a processor such as a central processing unit (CPU) and a memory corresponding to a main storage, and controls operations of each of the units in the communication terminal 300 by executing a predetermined program. Note that, the control unit 310 may include a plurality of processors that share and execute processing.

The image processing unit 320 executes image processing including the smoothing processing and the binarization processing. The image processing unit 320 includes, for example, an image processing processor such as a graphics processing unit (GPU). Alternatively, a part or the whole of functions of the image processing unit 320 may be realized as one function of the control unit 310 by software.

The storage unit 330 stores data needed to execute processing. The storage unit 330 includes a non-volatile storage medium such as a flash memory and a hard disk. Further, the storage unit 330 may include a removable storage medium such as a memory card and a reader/writer thereof. Data stored in the storage unit 330 may include data (format information 306, character string database 307, and character recognition dictionary 308) exemplified in FIG. 9 in addition to a program.

The communication unit 340 gives and receives data to and from another device. The communication unit 340 transmits and receives data to and from another device via, for example, a wired or wireless network. Alternatively, the communication unit 340 may directly communicate with another device without a network.

The UI unit 350 receives an input from a user and transmits information to the user. The UI unit 350 may include a display device such as a liquid crystal display, a keypad, a touch screen display, a speaker, a microphone, and the like. The UI unit 350 may include a haptic (tactile) interface such as a vibrator.

The camera unit 360 generates image data. The camera unit 360 includes an optical member such as a lens and an image sensor, and generates image data indicating a captured subject. Note that, the number of pixels and the number of gradations of image data are not limited to a specific numerical value as long as a subject can be recognized.

The control unit 310 in the communication terminal 300 can execute a predetermined application program having a character recognition function. This application program is software for optically reading a display material on which a character and the like are written and recognizing a displayed character. The display material may be a sticker, a poster, a magazine, and the like and is not particularly limited as long as a character is written thereon. In the present example embodiment, the display material is assumed to be a plurality of kinds of cards. Hereinafter, this application program is also referred to as a "character recognition app" for the sake of description.

Figure 9:
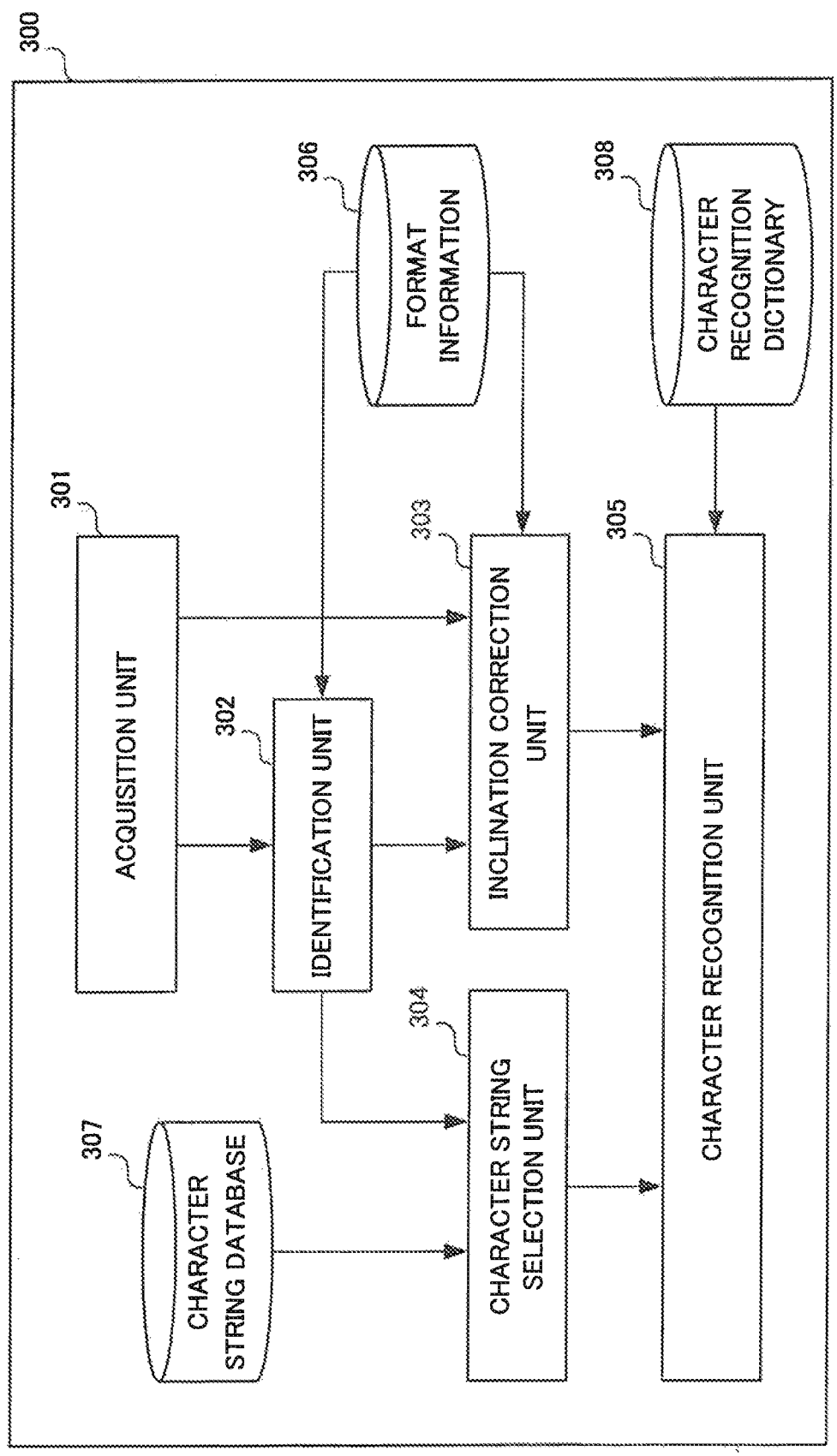
FIG. 9 is a block diagram illustrating one example of a configuration of a function realized by the communication terminal.

FIG. 9 is a block diagram illustrating a configuration of a function realized by the character recognition app. Note that, an arrow connecting blocks in FIG. 9 merely illustrates one example of a flow (direction) of information and does not intend to limit a flow of information to a specific direction.

The character recognition app realizes functions corresponding to an acquisition unit 301, an identification unit 302, an inclination correction unit 303, a character string selection unit 304, and a character recognition unit 305 in the communication terminal 300. Further, the storage unit 330 stores the format information 306, the character string database 307, and the character recognition dictionary 308. These pieces of data are generated by executing the character recognition app, received from the outside, or included in the character recognition app.

The format information 306 is information indicating a format of each classification of a card. The format information 306 indicates what kind of image a card in each classification is. For example, the format information 306 is data indicating an image in which a card in each classification is captured from a predetermined direction (for example, front). Note that, "data indicating an image" herein may be image data or data describing a feature (such as a feature point and a feature amount) specified from an image.

Further, the format information 306 may include information indicating a region of a card in each classification in which the character recognition processing is executed. A region in which a character is written (or a region in which a character needed to be read is written) may be different in each classification of a card. The format information 306 includes information (such as coordinates) indicating such the region. Hereinafter, the region defined by the format information 306 (that is, the region in which the character recognition processing is executed) is also referred to as a "clipping region".

A card (such as a driver's license) on which information unique to a user is written generally includes a region in which an external appearance may be different in each card on which the information is written, and also includes a common region (such as a background) regardless of a user. The clipping region typically includes the former region.

The character string database 307 stores character string information defining a character string read from a card for each classification of a card. The character string information indicates the number of characters, a kind, a format, and the like of a character string needed to be read from a card. The character string information may indicate regularity of a character instead of a character itself. For example, the character string information may be data in which regularity such as "four numbers" and an "upper-case or lower-case alphabetic character" is described with a regular expression and the like.

The character recognition dictionary 308 stores dictionary information indicating a plurality of characters as read targets. The dictionary information may be image data in which a character is binarized or data indicating a feature amount of a binarized character. The character recognition dictionary 308 may include dictionary information about one character in one or a plurality of typefaces (fonts).

A character indicated by the dictionary information may include a standard-shaped character and a character modified or processed from a standard-shaped character. For example, the dictionary information may include a plurality of kinds of data about an individual character that have the same typeface and different smoothing levels. Further, the dictionary information may include a plurality of kinds of data about an individual character that have the same typeface and different inclinations (three-dimensional rotations). These pieces of data may be accumulated in the character recognition dictionary 308 by using machine learning.

Figure 10:
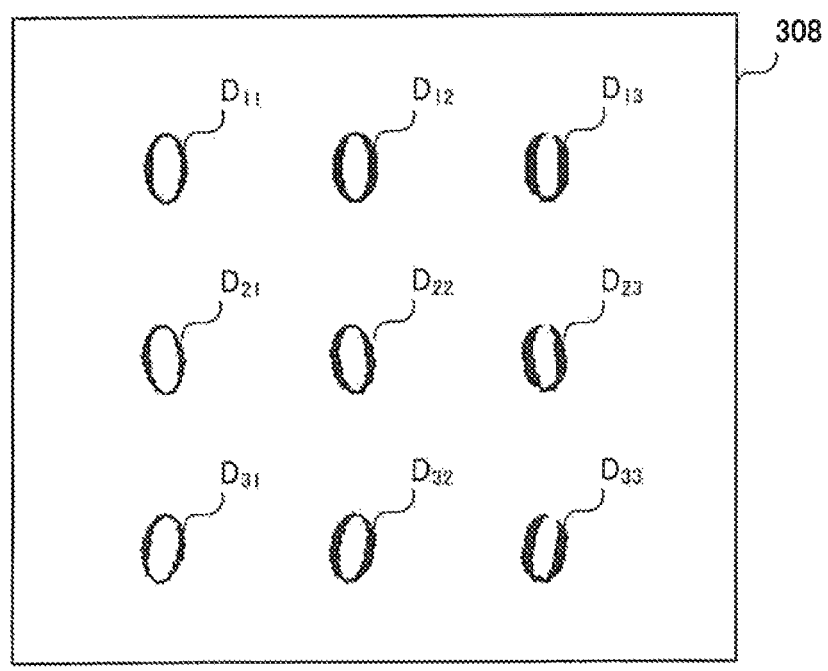
FIG. 10 is a diagram illustrating one example of data stored in a dictionary.

FIG. 10 is a diagram illustrating one example of data stored in the character recognition dictionary 308. The example illustrated in FIG. 10 illustrates nine kinds of data about a character "0" to which two ways of smoothing and two ways of rotation are applied. Herein, data $D_{11}$ corresponds to a character as a reference of smoothing and rotation. In this example, data $D_{11}$, $D_{12}$, and $D_{13}$ have the same inclination and different smoothing levels. In this example, data $D_{12}$, $D_{22}$, and $D_{32}$ have the same smoothing level and different inclinations. Data $D_{11}$, $D_{21}$, and $D_{31}$ correspond to characters that are not smoothed.

The acquisition unit 301 acquires image data generated by the camera unit 360. The acquisition unit 301 may acquire image data directly from the camera unit 360, or may acquire image data generated by the camera unit 360 and then stored in the storage unit 330. The acquisition unit 301 corresponds to one example of the acquisition unit 110 in the first example embodiment.

The identification unit 302 identifies a subject included in image data acquired by the acquisition unit 301. In the present example embodiment, the identification unit 302 identifies a classification of a card included in an image indicated by image data by using the format information 306. Note that, a classification of a card read by the character recognition app is previously determined.

The identification unit 302 has a function of calculating inclination information indicating an inclination of an image of a card indicated by image data from a reference direction (for example, front). The inclination information is, for example, a projective transformation matrix (homography matrix) indicating projective transformation from a certain plane to another plane. One example of a method for calculating inclination information is described in paragraph [0093] in PTL 3 by the same inventor as that of the present description.

The inclination correction unit 303 corrects an inclination of an image indicated by image data acquired by the acquisition unit 301. The inclination correction unit 303 can correct an inclination of an image by using inclination information calculated by the identification unit 302. Note that, correction herein does not only mean that an inclination of an image is eliminated, and may mean that an inclination is closer to a reference direction and reduced (closer to a reference direction than that before correction).

Further, the inclination correction unit 303 has a function of extracting (cutting out) a region of a part of an image having an inclination corrected. The inclination correction unit 303 extracts an image in a clipping region by using the format information 306 corresponding to a classification of a card identified by the identification unit 302.

The character string selection unit 304 selects character string information defining a character string read from a card. The character string information indicates the number of characters, a kind, a format, and the like of a character string needed to be read from a card. The character string selection unit 304 refers to the character string information about a classification identified by the identification unit 302 among the character string information stored for each classification of a card in the character string database 307.

The character recognition unit 305 executes character recognition processing on an image having an inclination corrected and being extracted by the inclination correction unit 303. The character recognition unit 305 can execute the character recognition processing by using, for example, a known optical character recognition (OCR) technology. The character recognition unit 305 recognizes a character included in an image in the clipping region by using the character string information selected by the character string selection unit 304 and the dictionary information stored in the character recognition dictionary 308. The character recognition unit 305 corresponds to one example of the smoothing unit 120 and the binarization unit 130 in the first example embodiment and the character recognition unit 210 in the second example embodiment.

Figure 11:
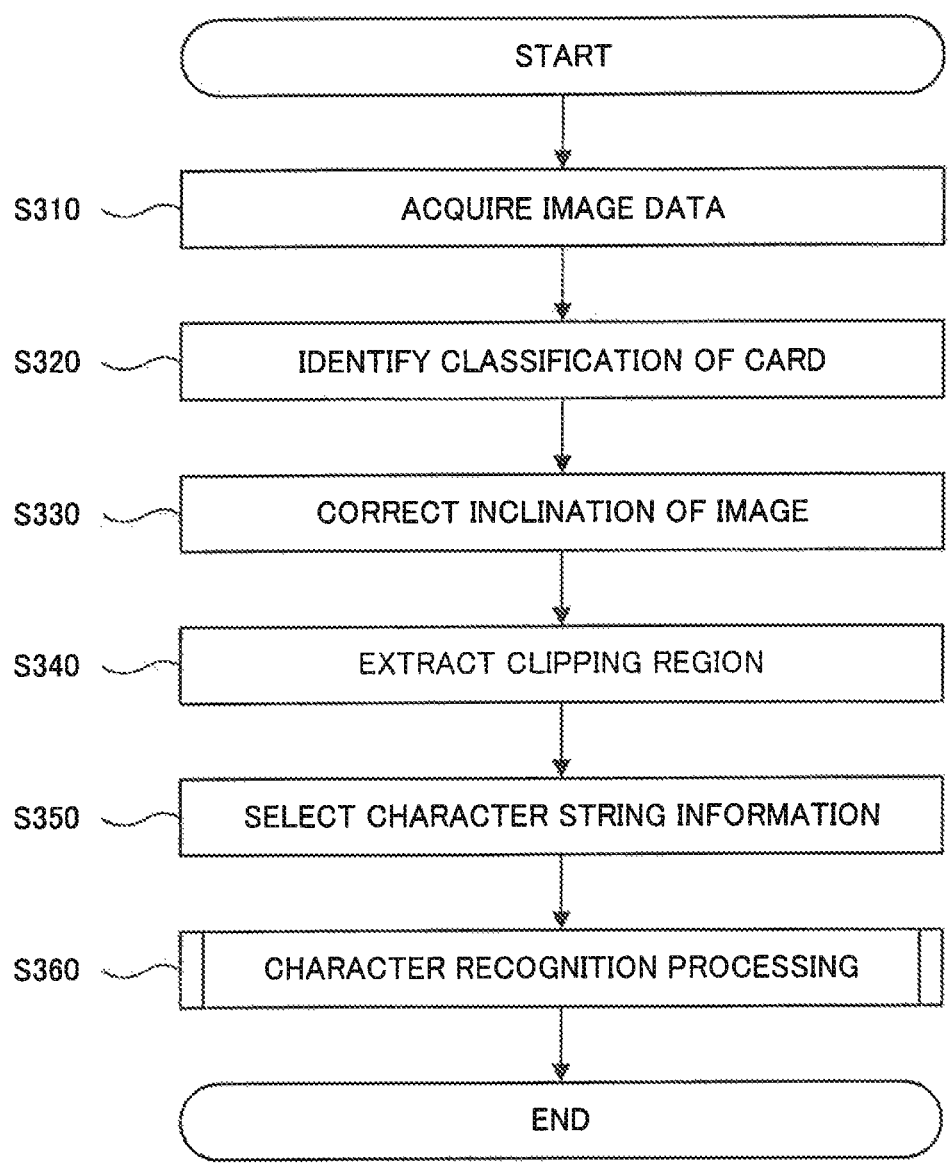
FIG. 11 is a flowchart illustrating one example of operations of the communication terminal.

FIG. 11 is a flowchart illustrating processing by the character recognition app. The acquisition unit 301 acquires image data indicating a captured card (Step S310). At this time, the acquisition unit 301 may cause the UI unit 350 to display a screen prompting a user to capture a card, or may allow a user to select necessary image data from data stored in the storage unit 330.

The identification unit 302 identifies the classification of the card indicated by the image data acquired in Step S310 (Step S320). At this time, the identification unit 302 also calculates the inclination information. The inclination correction unit 303 corrects an inclination of an image indicated by the image data acquired in Step S310, based on the inclination information (Step S330). Further, the inclination correction unit 303 extracts the clipping region from the corrected image (Step S340). In addition, the character string selection unit 304 selects the character string information according to the classification of the card identified in Step S320 (Step S350).

Note that, the character string selection unit 304 may select the character string information about a plurality of character strings concerned with one clipping region. For example, when the plurality of character strings may be written in the clipping region and vary in the number of characters and format, the character string selection unit 304 may select a plurality of pieces of character string information as character string information corresponding to the clipping region. In such a case, the character recognition unit 305 executes the character recognition processing in Step S360 on each piece of the character string information.

Note that, the processing in Steps S330 and S340 and the processing in Step S350 may not be executed in the illustrated order. For the processing, the processing in Step S350 may be executed before the processing in Step S330, or the processing in Steps S330, S340, and S350 may be executed simultaneously.

The character recognition unit 305 executes the character recognition processing on the image extracted in Step S340 (Step S360). The character recognition unit 305 refers to the character string information selected in Step S350 and executes processing according to the classification of the captured card.

Figure 12:
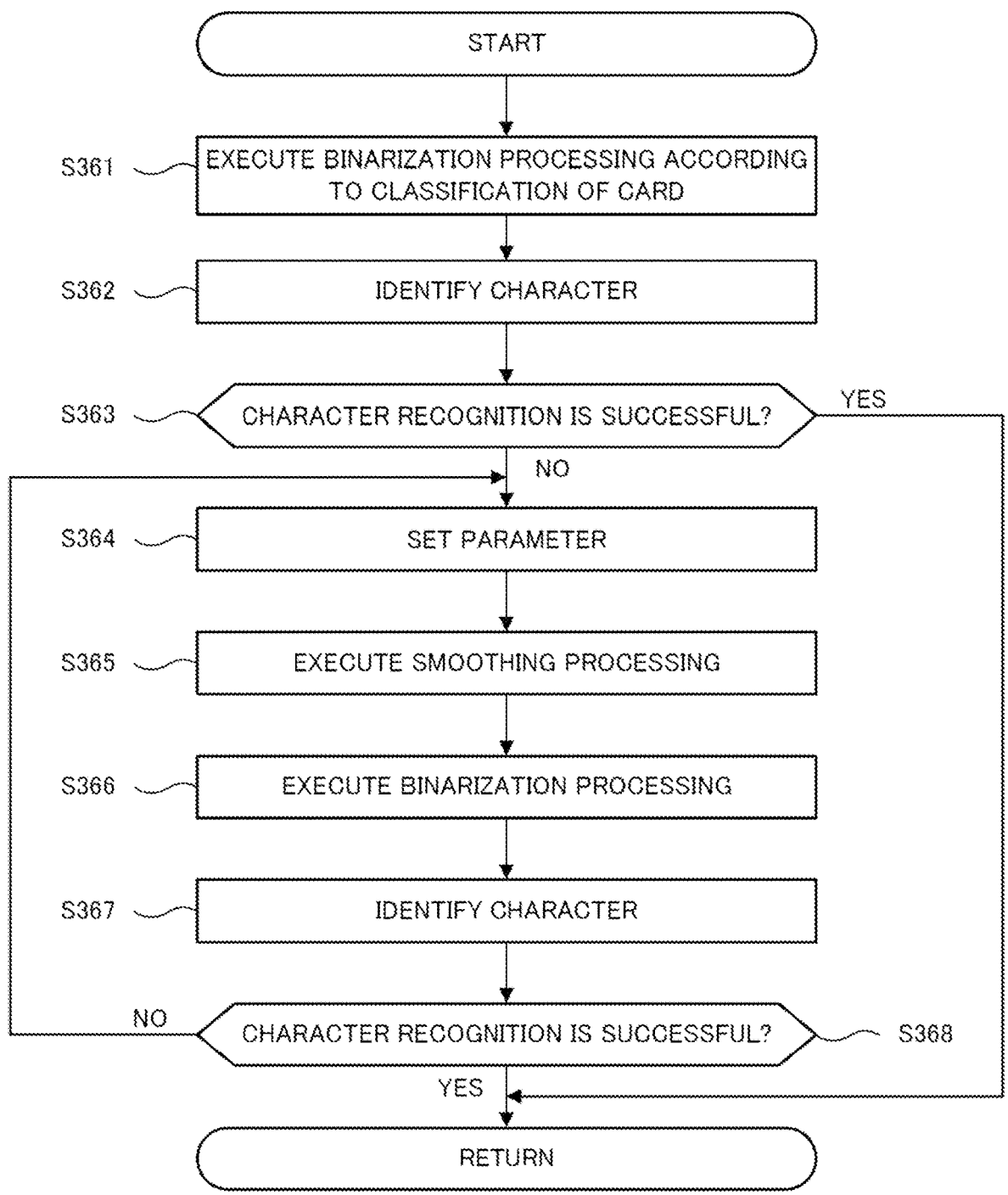
FIG. 12 is a flowchart illustrating a specific example of character recognition processing.

FIG. 12 is a flowchart illustrating a specific example of the character recognition processing in Step S360 of FIG. 11. In this example, the character recognition unit 305 executes the processing (Steps S361 to S363) according to the classification of the card, and then executes the common processing (Steps S364 to S368) regardless of the classification of the card. However, the character recognition processing is not limited to this example. For example, the character recognition unit 305 may skip Steps S361 to S363, and may change the processing in Steps S364 to S368 according to a classification of a card.

The character recognition unit 305 first executes the binarization processing according to the classification of the card (Step S361). For example, the character recognition unit 305 executes the binarization processing based on a discrimination analysis method when a card in a classification includes a pattern in a base, and executes the binarization processing based on a local binarization method when a card in another classification does not include a pattern in a base. Note that, a pattern of a card is generally lighter in color than a character.

The discrimination analysis method is a binarization method for determining a threshold value based on a histogram of gradation values indicating light and dark of an image, and is also referred to as an Otsu's method. The discrimination analysis method uses a threshold value common to the entire image. In contrast, the local binarization method determines the threshold value for each local region of an image. The local binarization method uses, for example, an average value of gradation values calculated for each local region having a predetermined size as the threshold value. The threshold value in the local binarization method may be an average value of gradation values calculated for each local region to which a predetermined number is added, or may be a statistic calculated based on an image.

In Step S361, the character recognition unit 305 may not execute the smoothing processing when executing the binarization processing based on the discrimination analysis method, and may execute the smoothing processing when executing the binarization processing based on the local binarization method. However, the character recognition unit 305 may not execute the smoothing processing, and may execute common smoothing processing regardless of the classification of the card.

Note that, the character recognition unit 305 may change a binarization method according to not only presence or absence (intensity) of a pattern but also presence or absence (intensity) of specular reflection on a card surface. For example, in a case of a card having strong specular reflection (having a glossy surface), the character recognition unit 305 executes the binarization processing by the local binarization method. On the other hand, in a case of a card having weak specular reflection, the character recognition unit 305 executes the binarization processing by the discrimination analysis method.

The character recognition unit 305 identifies a character from an image on which the binarization processing is executed (Step S362). Specifically, the character recognition unit 305 cuts out an individual character from the clipping region and identifies the character by using character string information and dictionary information. A known method in the OCR technology is applicable to the processing in Step S362.

Herein, the character recognition unit 305 determines whether the character recognition is successful (Step S363). Specifically, the character recognition unit 305 determines whether a character string in the entire clipping region is correctly recognized based on the identification result in Step S362. The character recognition unit 305 may execute the determination by using the character string information and the dictionary information.

Note that, when a plurality of pieces of character string information are selected for one clipping region, the character recognition unit 305 may execute the determination in Step S363 by using any of results of recognizing a plurality of character strings corresponding to the plurality of pieces of character string information. For example, the character recognition unit 305 may compare a probability and a variation in a height of a character among the plurality of character strings, specify a character string that there is a high likelihood (that is plausible), and execute the determination in Step S363 on the specified character string.

When the character recognition is successful at this point of time (YES in Step S363), the character recognition unit 305 terminates the processing without executing the processing after Step S364. On the other hand, when the character recognition is unsuccessful (NO in Step S363), the character recognition unit 305 executes the processing after Step S364.

In Step S364, the character recognition unit 305 sets the smoothing parameter. The character recognition unit 305 sets the smoothing parameter at the highest smoothing level immediately after Step S363. The character recognition unit 305 executes the smoothing processing according to the smoothing parameter set in Step S364 (Step S365), and executes the binarization processing on the image smoothed in Step S365 (Step S366). In Step S366, the character recognition unit 305 executes the binarization processing by the local binarization method.

The character recognition unit 305 identifies a character from the image on which the binarization processing is executed (Step S367). Then, the character recognition unit 305 determines whether the character recognition is successful (Step S368). The processing in Steps S367 to S368 is respectively the same processing as the processing in Steps S362 to S363.

When the character recognition is successful (YES in Step S368), the character recognition unit 305 terminates the processing at this point of time. On the other hand, when the character recognition is unsuccessful (NO in Step S368), the character recognition unit 305 executes the processing after Step S364 again. When repeating the processing in Step S364, the character recognition unit 305 changes the smoothing parameter. Specifically, the character recognition unit 305 changes the smoothing parameter such that a smoothing level is lower than the last time.

When the character recognition unit 305 does not succeed in the character recognition even by repeating the processing in Steps S364 to S368 for a predetermined number of times, the character recognition unit 305 may execute predetermined processing. For example, in this case, the acquisition unit 301 may cause the UI unit 350 to display a screen prompting a user to capture a card again. This screen may include a message prompting the user to change (improve) a capturing condition, such as "PHOTOGRAPH AT BRIGHTER PLACE" and "BRING TERMINAL CLOSER TO CARD AND PHOTOGRAPH".

As described above, the communication terminal 300 can execute the processing according to the classification of the card serving as a subject by identifying the classification of the card with the identification unit 302. The communication terminal 300 can further enhance accuracy of processing (such as inclination correction and character recognition) on a subsequent stage in comparison with a case without the identification unit 302. Further, the communication terminal 300 executes the character recognition processing on an image included in the clipping region determined according to the classification of the card, and therefore the character recognition processing on an unnecessary region (other than the clipping region) can be omitted.

Further, the communication terminal 300 can reduce a possibility of false recognition of a character and execute the character recognition with high accuracy regardless of a capturing condition, similarly to the character recognition device 200 in the second example embodiment. For example, the character recognition app is installed in a plurality of communication terminals 300, not only performance (such as image quality and resolution) of the camera unit 360 may be different in each terminal, but also a capturing place and a capturing skill may vary from user to user. Therefore, in such a case, even when users each capture the same kind of cards, images captured in various capturing conditions may be read targets. Even when such images are read targets, the communication terminal 300 can execute highly accurate character recognition.

A card as a read target in the present example embodiment may include information having a high degree of confidentiality or great importance, such as user's personal information. False recognition generally needs to be avoided to handle such information. The communication terminal 300 is configured to fail in recognition and redo processing rather than to mistakenly recognize a character, and can thus reduce a possibility that a character is mistakenly recognized.

Modification Example

The present disclosure is not limited to the above-described first example embodiment to third example embodiment. The present disclosure may include an aspect to which modification or application that may be understood by a person skilled in the art is applied. For example, the present disclosure includes modification examples described below. Further, the disclosure may include an aspect in which matters described in the present description are appropriately combined as necessary. For example, a matter described with a specific example embodiment may also be applied to another example embodiment.

Modification Example 1

The communication terminal 300 may record data according to the result of the character recognition in the storage unit 330. Alternatively, the communication terminal 300 may transmit data according to the result of the character recognition to the outside (for example, a predetermined server device) via the communication unit 340. For example, the communication terminal 300 may transmit text data indicating the recognized character string to a server device, and may transmit the image data used in the character recognition to the server device.

When data is recorded or transmitted, the communication terminal 300 may execute processing according to the classification of the card. For example, the communication terminal 300 may transmit text data indicating a recognized character string to the server device when a card is in a specific classification, and may transmit image data used in the character recognition to the server device when the card is in another classification.

Modification Example 2

The communication terminal 300 may successively read cards in a plurality of classifications. In this case, the communication terminal 300 may use the result of the character recognition using a card in the classification for the character recognition of a card in another classification.

For example, with a card in a first classification and a card in a second classification serving as read targets, when common information (for example, user's name and date of birth) is written on both of the cards, the communication terminal 300 may compare character strings recognized from both of the cards.

Figure 13:
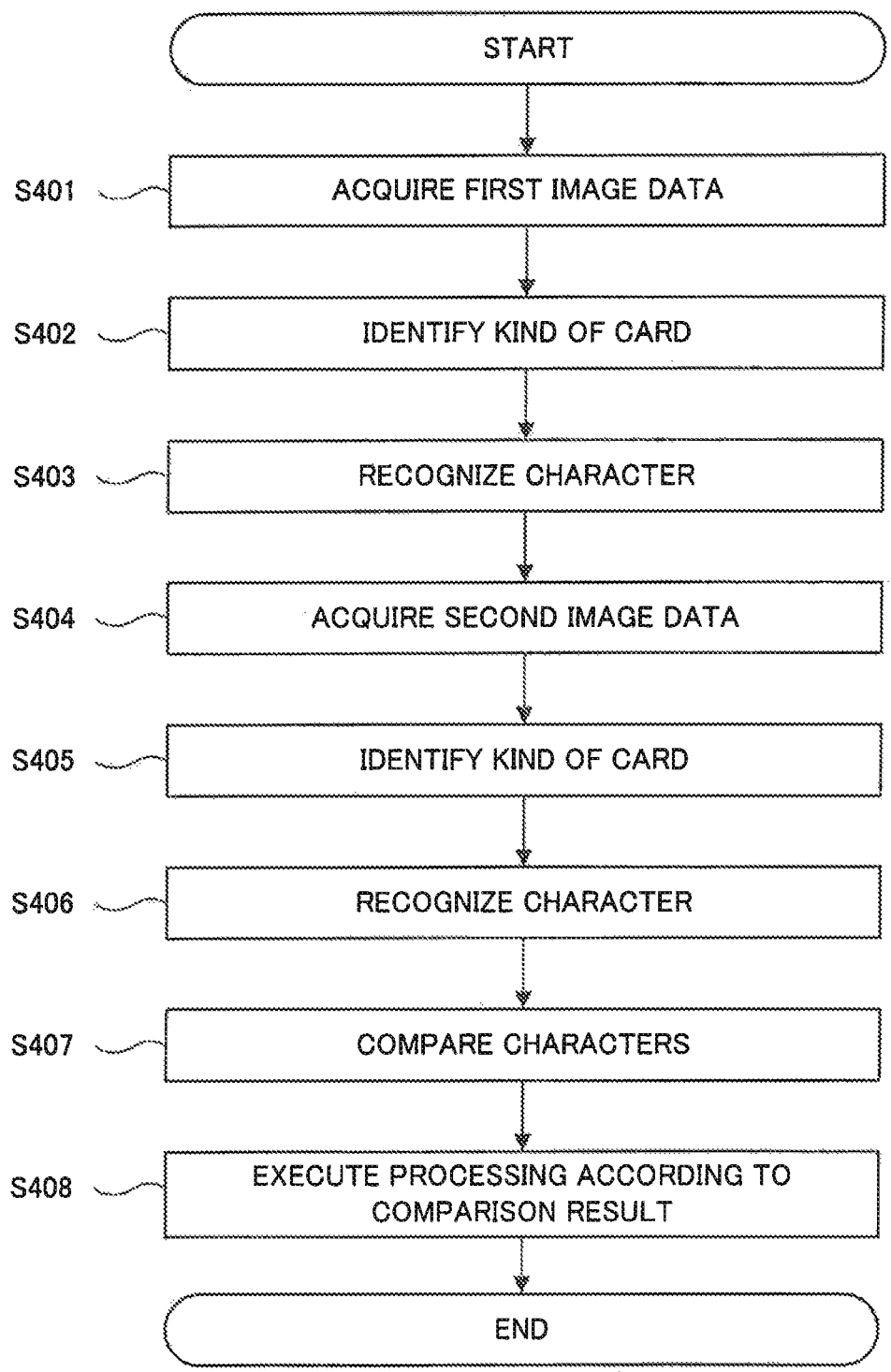
FIG. 13 is a flowchart illustrating another example of operations of the communication terminal.

FIG. 13 is a flowchart exemplifying an outline of processing according to the present modification example. In this example, the communication terminal 300 acquires first image data indicating the card in the first classification (Step S401), and identifies the classification of the card indicated by the first image data (Step S402). The communication terminal 300 executes the character recognition processing according to the classification identified in Step S402 and recognizes a character (Step S403).

Note that, it is assumed that the character recognized in Step S403 includes a specific character string written on both of the card in the first classification and the card in the second classification. It is assumed that the specific character string is written in a predetermined region of the card in the first classification and the card in the second classification.

Herein, the communication terminal 300 acquires second image data indicating the card in the second classification (Step S404). The communication terminal 300 identifies the classification of the card, similarly to the case of the first image data (Step S405). The communication terminal 300 executes the character recognition processing according to the classification identified in Step S405 and recognizes a character (Step S406).

The communication terminal 300 compares the specific character string recognized in Step S403 with the specific character string recognized in Step S406 (Step S407). Next, the communication terminal 300 executes processing according to the comparison result in Step S407 (Step S408).

Such processing can be used, for example, to verify personal identification by using a plurality of cards. In this case, when the character strings compared in Step S407 match, the communication terminal 300 determines that a user has gone through formalities (that is to say, a card is not illegally acquired by a third party).

In this example, the communication terminal 300 may record data indicating the character recognized in Step S403 in the character string database 307. The communication terminal 300 may recognize a character by using data recorded in the character string database 307 in such a manner in Step S406.

Modification Example 3

The communication terminal 300 may receive setting of the clipping region from a user. In this case, the user can set the clipping region by selecting a desired region on a card via the UI unit 350.

Modification Example 4

The character recognition unit 305 may refer to a lexicon when recognizing a character string. Herein, the lexicon represents a character string previously given as a candidate for a character string to be recognized. By referring to the lexicon, the character recognition unit 305 can suppress a decrease in accuracy of the character recognition even when image quality decreases due to a capturing condition and smoothing processing.

It is assumed as one example that a character string to be recognized includes a user's year of birth and "19XX (where X is an arbitrary number)" is given as the lexicon. In this case, it is assumed that the character recognition unit 305 specifies the candidate for the character that may correspond to a character written in each position and also calculates a numerical value (a degree of confidence) given to the candidate.

For example, it is assumed that the character recognition unit 305 specifies "7" and "1" as the candidate for the character in a thousand's place, and "7" has a higher degree of confidence than that of "1". In this case, when not referring to the lexicon, the character recognition unit 305 recognizes (that is, mistakenly recognizes) "7" as the character in the thousand's place. On the other hand, when referring to the lexicon, the character recognition unit 305 can determine that the character in the thousand's place is more likely to be "1". In this case, the character recognition unit 305 recognizes "1" instead of "7" having the highest degree of confidence as the character in the thousand's place. In other words, when the lexicon suggests a specific character, the character recognition unit 305 recognizes the character even when the character does not have the highest degree of confidence, as long as a degree of confidence of the character satisfies a certain condition.

Note that, when the recognized character string includes a character that may not be recognized, based on the lexicon, the character recognition unit 305 can exclude the character from the recognition result. For example, when a character other than a number is recognized in a region (like a date of birth mentioned above) where a number needs to be recognized, the character recognition unit 305 excludes the character from the recognition result.

Modification Example 5

When a plurality of clipping regions are set for one card, the character recognition unit 305 may execute different image processing on each of the clipping regions. Alternatively, when the clipping region includes a plurality of characters, the character recognition unit 305 may execute different image processing on each of the characters. For example, the character recognition unit 305 may set a different smoothing parameter for each clipping region and execute smoothing processing, or may execute binarization processing by a different method for each clipping region.

Modification Example 6

The communication terminal 300 may have a configuration without a part of the configuration illustrated in FIGS. 8 and 9. For example, the communication terminal 300 may have a configuration without the identification unit 302. In this case, the communication terminal 300 may specify a classification of a card from an input (operation) of a user. Further, the communication terminal 300 may have a configuration without the inclination correction unit 303 and the character string selection unit 304.

Modification Example 7

In the present disclosure, an object (subject) of a read target is not particularly limited. The object of the read target may not be a card. Further, the present disclosure is also applicable to recognition of an object other than a character.

Modification Example 8

A specific hardware configuration of each of the devices (the image processing device 100, the character recognition device 200, and the communication terminal 300) according to the present disclosure has conceivable diverse variations, and is not limited to a specific configuration. For example, each of the devices may be realized by using software or configured to share various processing by using a plurality of hardware.

Figure 14:
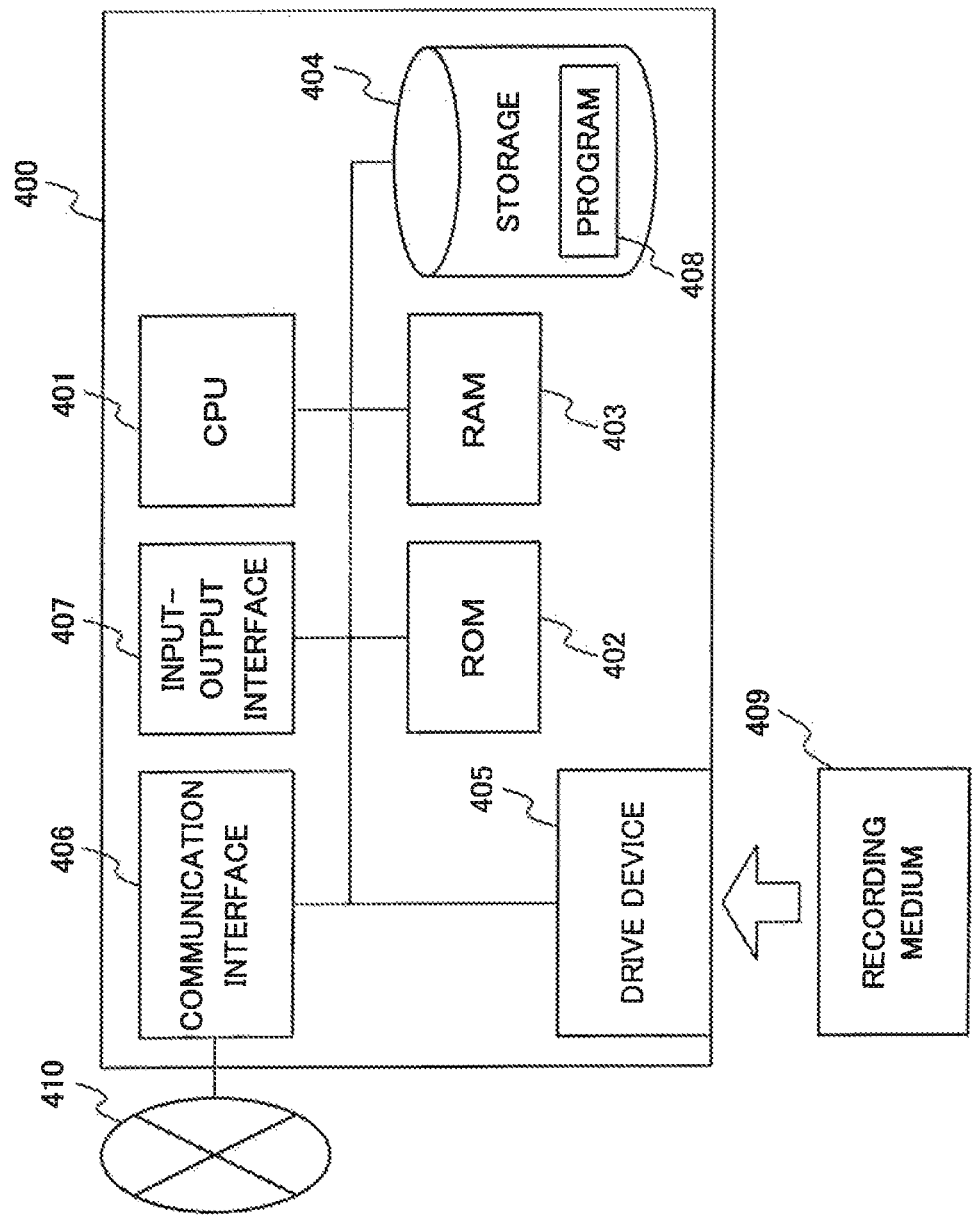
FIG. 14 is a block diagram illustrating one example of a hardware configuration of a computer device.

FIG. 14 is a block diagram illustrating one example of a hardware configuration of a computer device 400 that realizes each of the devices. The computer device 400 includes a central processing unit (CPU) 401, a read only memory (ROM) 402, a random access memory (RAM) 403, a storage 404, a drive device 405, a communication interface 406, and an input-output interface 407. Each of the devices according to the present disclosure may be realized by (a part of) the configuration illustrated in FIG. 14.

The CPU 401 executes a program 408 by using the RAM 403. The program 408 may be stored in the ROM 402. Further, the program 408 may be recorded in a recording medium 409 such as a memory card and read by the drive device 405, or may be transmitted from an external device via a network 410. The communication interface 406 exchanges data with the external device via the network 410. The input-output interface 407 exchanges data with a peripheral device (such as an input device and a display device). The communication interface 406 and the input-output interface 407 may each function as a means for acquiring or outputting data.

Note that, a component of each of the devices may be formed of a single circuit (such as a processor) or a combination of a plurality of circuits. The circuit (circuitry) herein may be either a dedicated or general-purpose circuit.

The configuration described as a single device in the above-described example embodiment may be distributed in a plurality of devices. For example, the image processing device 100 or the character recognition device 200 may be realized by a plurality of computer devices by using a cloud computing technology and the like. Further, the communication terminal 300 may be formed such that a server device executes a part of the processing illustrated in FIG. 11.

[Supplementary Note]

A part or the whole of the above-described example embodiments may also be described in Supplementary Notes below, which is not limited thereto.

(Supplementary Note 1) An image processing device including:
  a processor configured to:
  acquire an image;
  smooth the acquired image at a predetermined smoothing level;
  binarize the smoothed image; and
  smooth the image while varying the smoothing level for a plurality of times.

(Supplementary Note 2) The image processing device according to Supplementary Note 1, wherein the processor smooths the image for a plurality of times in descending order of the smoothing level.

(Supplementary Note 3) The image processing device according to Supplementary Note 2, wherein the processor repeatedly smooths the image until a predetermined condition is satisfied.

(Supplementary Note 4) The image processing device according to Supplementary Note 3, wherein the predetermined condition includes a condition concerned with a result of character recognition performed on an image smoothed and binarized.

(Supplementary Note 5) The image processing device according to any one of Supplementary Notes 1 to 4, wherein the processor binarizes the smoothed image by using a threshold value determined for each local region of the image.

(Supplementary Note 6) The image processing device according to any one of Supplementary Notes 1 to 5, wherein the processor executes filter processing that varies in at least one of a size of a filter and a weighting factor depending on the smoothing level.

(Supplementary Note 7) The image processing device according to Supplementary Note 6, wherein the processor executes the filter processing by using a moving-average filter or a weighted-average filter.

(Supplementary Note 8) A character recognition device including:
acquire an image;
smooth the acquired image at a predetermined smoothing level;
binarize the smoothed image;
recognize a character included in the binarized image; and
smooth the image while varying the smoothing level depending on a result of character recognition.

(Supplementary Note 9) The character recognition device according to Supplementary Note 8, wherein the processor refers to a dictionary and recognizes a character, the dictionary includes information on a plurality of characters obtained by smoothing a character as a reference while varying the smoothing level.

(Supplementary Note 10) The character recognition device according to Supplementary Note 8 or 9,
wherein the processor further identifies a classification of a subject included in the image,
wherein the processor binarizes the smoothed image by a method depending on the identified classification.

(Supplementary Note 11) An image processing device including:
a processor configured to:
acquire an image;
smooth the acquired image at a predetermined smoothing level;
binarize the smoothed image; and
terminate an operation when a predetermined condition is satisfied and smooths smooth the acquired image while varying the smoothing level when the condition is not satisfied.

(Supplementary Note 12) An image processing method including:
by computer,
acquiring an image;
smoothing the acquired image at a predetermined smoothing level;
binarizing the smoothed image; and
smoothing and binarizing on the acquired image while varying the smoothing level.

(Supplementary Note 13) An image processing method including:
by computer,
acquiring an image;
smoothing the acquired image at a predetermined smoothing level;
binarizing the smoothed image; and
terminating an operation when a predetermined condition is satisfied, and smoothing and binarizing on the acquired image again while varying the smoothing level when the condition is not satisfied.

(Supplementary Note 14) A non-transitory program recording medium that is computer-readable and records a program causing a computer to execute:
acquiring an image;
smoothing the acquired image at a predetermined smoothing level;
binarizing the smoothed image; and
smoothing the image while varying the smoothing level for a plurality of times.

(Supplementary Note 15) A non-transitory program recording medium that is computer-readable and records a program causing a computer to execute:
acquiring an image;
smoothing the acquired image at a predetermined smoothing level;
binarizing the smoothed image; and
terminating an operation when a predetermined condition is satisfied, and smoothing the image while varying the smoothing level on the acquired image when the condition is not satisfied.

This application is based upon and claims the benefit of priority from Japanese patent application No. 2016-025905, filed on Feb. 15, 2016, the disclosure of which is incorporated herein in its entirety by reference.

REFERENCE SIGNS LIST

100 Image processing device
110 Acquisition unit
120 Smoothing unit
130 Binarization unit
140 Control unit
200 Character recognition device
210 Character recognition unit
220 Control unit
300 Communication terminal
310 Control unit
320 Image processing unit
330 Storage unit
340 Communication unit
350 User interface unit
360 Camera unit
301 Acquisition unit
302 Identification unit
303 Inclination correction unit
304 Character string selection unit
305 Character recognition unit
306 Format information
307 Character string database
308 Character recognition dictionary

The invention claimed is:
1. An image processing device comprising:
a memory storing instructions; and
a processor configured to execute the instructions to:
acquire an image;
smooth the acquired image at a predetermined smoothing level, wherein the smoothing includes making unclear an object included in the acquired image;
binarize the smoothed image; and
repeat a series of processing including smoothing the acquired image and binarizing the smoothed image while varying the smoothing level in descending order of the smoothing level until a predetermined condition is satisfied.

2. The image processing device according to claim 1, wherein the predetermined condition includes a condition concerned with a result of character recognition performed on an image smoothed and binarized.

3. The image processing device according to claim 1, wherein the processor is further configured to execute the instructions to binarize the smoothed image by using a threshold value determined for each local region of the image.

4. The image processing device according to claim 1, wherein the processor is further configured to execute the instructions to execute filter processing that varies in at least one of a size of a filter and a weighting factor depending on the smoothing level.

5. The image processing device according to claim 4, wherein executing the filter processing includes using a moving-average filter or a weighted-average filter.

6. A computer-implemented image processing method comprising:
 acquiring an image;
 smoothing the acquired image at a predetermined smoothing level, wherein the smoothing includes making unclear an object included in the acquired image;
 binarizing the smoothed image; and
 repeating a series of processing including smoothing the acquired image and binarizing the smoothed image while varying the smoothing level in descending order of the smoothing level until a predetermined condition is satisfied.

7. A non-transitory program recording medium that is computer-readable and records a program causing a computer to execute the following method:
 acquiring an image;
 smoothing the acquired image at a predetermined smoothing level, wherein the smoothing includes making unclear an object included in the acquired image;
 binarizing the smoothed image; and
 repeating a series of processing including smoothing the acquired image and binarizing the smooth image while varying the smoothing level in descending order of the smoothing level until a predetermined condition is satisfied.

* * * * *